United States Patent
Yi et al.

(10) Patent No.: US 11,158,854 B2
(45) Date of Patent: *Oct. 26, 2021

(54) HIGH ENERGY CATHODES FOR LITHIUM ION BATTERIES

(71) Applicant: Wildcat Discovery Technologies, Inc., San Diego, CA (US)

(72) Inventors: Tanghong Yi, San Diego, CA (US); Bin Li, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,573

(22) Filed: Apr. 6, 2020

(65) Prior Publication Data

US 2020/0235391 A1 Jul. 23, 2020

Related U.S. Application Data

(63) Continuation of application No. 15/819,653, filed on Nov. 21, 2017, now Pat. No. 10,651,470.

(60) Provisional application No. 62/425,296, filed on Nov. 22, 2016.

(51) Int. Cl.
*H01M 4/525* (2010.01)
*H01M 10/0525* (2010.01)
*C01G 51/00* (2006.01)

(52) U.S. Cl.
CPC ............ *H01M 4/525* (2013.01); *C01G 51/42* (2013.01); *C01G 51/66* (2013.01); *H01M 10/0525* (2013.01); *C01P 2002/50* (2013.01); *C01P 2002/52* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 6,623,890 | B2* | 9/2003 | Munakata | C01G 51/50 429/231.95 |
| 7,648,693 | B2* | 1/2010 | Paulsen | C01G 51/50 423/594.4 |
| 2007/0275303 | A1* | 11/2007 | Ishimatsu | H01M 50/572 429/221 |
| 2015/0270577 | A1* | 9/2015 | Takezawa | H01M 4/386 429/331 |

* cited by examiner

*Primary Examiner* — Katie L. Hammer
(74) *Attorney, Agent, or Firm* — The Small Patent Law Group LLC; Philip S. Hof

(57) ABSTRACT

An electrode includes a material represented by $Li_{1-x}M_xCoO_{2-d}$ where $0<x\leq0.2$ and $0\leq d\leq0.2$. The variable M includes a metal selected from the group consisting of transition metals, Group I elements, and Group II elements.

20 Claims, 4 Drawing Sheets

HIGH ENERGY CATHODES FOR LITHIUM ION BATTERIES

CROSS-REFERENCE TO RELATED APPLICATIONS

This application is a continuation of pending U.S. application Ser. No. 15/819,653 ("the '653 Application"), which was filed on Nov. 21, 2017, and the entire disclosure of which is incorporated herein by reference. The '653 Application claims priority to U.S. Provisional Application No. 62/425,296 ("the '296 Application"), filed Nov. 22, 2016. This application also claims priority to the '296 Application, and the entire disclosure of which is incorporated herein by reference.

BACKGROUND

The present disclosure is in the field of battery technology and, more particularly, in the area of improved active materials for use in electrodes in electrochemical cells.

Research into active materials for cathodes for secondary batteries has yielded several classes of active materials. One class of these active materials, which are commonly used in portable electronics, is lithium cobalt oxide, producing a cathode half-reaction during discharge as follows:

$$Li_{1-x}CoO_2 + xLi^+ + xe^- \leftrightarrow LiCoO_2 \qquad (i)$$

Lithium cobalt oxide cathode materials have high energy densities and relatively stable capacities. However, one of the major drawbacks to lithium cobalt oxide cathode materials is that only about 50% of the lithium ions present in the cathode can be used before the reduced cobalt cannot be re-oxidized and a permanent phase transition occurs. The electrochemical change to the cobalt and the permanent phase transition reduce the capability of the cathode to accept lithium ions during discharging. The result is a permanent reduction in cell performance. Notably, there is a permanent loss of reversible capacity.

There have been prior attempts to mitigate the reduction in cell performance and the permanent loss of capacity, but such efforts have met with limited success. For example, Zou et al. have experimented with doping $LiCoO_2$ for high voltage cycling (that is, cycling up to about 4.5 V) (see, Zuo et al., "Synthesis of High-Voltage (4.5 V) Cycling Doped $LiCoO_2$ for Use in Lithium Rechargeable Cells", Chem. Mater., 2003, 15, 4699-4702.). Luo et al. have experimented with magnesium substituted $LiCoO_2$ (see, Luo et al., "Synthesis and Characterization of Mg Substituted $LiCoO_2$", Journal of the Electrochemical Society, 2010, 157, A782-A790). Koyama et al. discuss the theoretical limits of doping $LiCoO_2$ with various compounds (see, Koyama et al. "First Principles Study of Dopant Solubility and Defect Chemistry in $LiCoO_2$," Koyama et al., J. Mater. Chem. A, 2014, 2, 11235). Kazada et al. have experimented with doping $LiCoO_2$ with sodium and potassium (see, Kazada et al. "Comparison of Material Properties of $LiCoO_2$ Doped with Sodium and Potassium", Portugaliae Electrochimica Acta, 2013, 31, 331-336). Wang et al. have experimented with Mg doping on $LiCoO_2$ in conjunction with a zirconium oxyfluoride coating (see, Wang et al. "Improving the cycling stability of $LiCoO_2$ at 4.5 V through co-modification by Mg doping and zirconium oxyfluoride coating", Ceramics International, 2015, 41, 469-474). Chandrasekaran et al. synthesized a cathode containing $LiCoO_2$ and various dopants (see, Chandrasekaran et al. "High-performing $LiMg_x$-$Cu_yCo_{1-x-y}O_2$ Cathode Material for Lithium Rechargeable Batteries", ACS Appl. Mater. Interfaces 2012, 4, 4040-4046).

Despite ongoing research into electrode constructions that theoretically may allow for greater utilization of lithium ions without diminished future capacity, there remains a need for lithium cobalt oxide based cathode materials with improved capacity throughout the battery cycle life.

SUMMARY

According to one or more embodiments, a composition and method for improving the lithium ion utilization of lithium cobalt oxide materials is presented herein. A method for making the composition and methods for making and using cells including the composition are included.

In one or more embodiments, an electrode is provided that includes a material represented by $Li_{1-x}M_xCoO_{2-d}$ where $0<x\leq 0.2$ and $0\leq d\leq 0.2$. The variable M includes a metal selected from the group consisting of transition metals, Group I elements, and Group II elements.

In one or more embodiments, a battery is provided that includes an anode, a cathode, and an electrolyte between the anode and the cathode. The cathode includes an active material represented by $Li_{1-x}M_xCoO_{2-d}$, where $0<x\leq 0.2$ and $0\leq d\leq 0.2$. The variable M includes a metal selected from the group consisting of transition metals, Group I elements, and Group II elements.

DETAILED DESCRIPTION

Figure 1A:
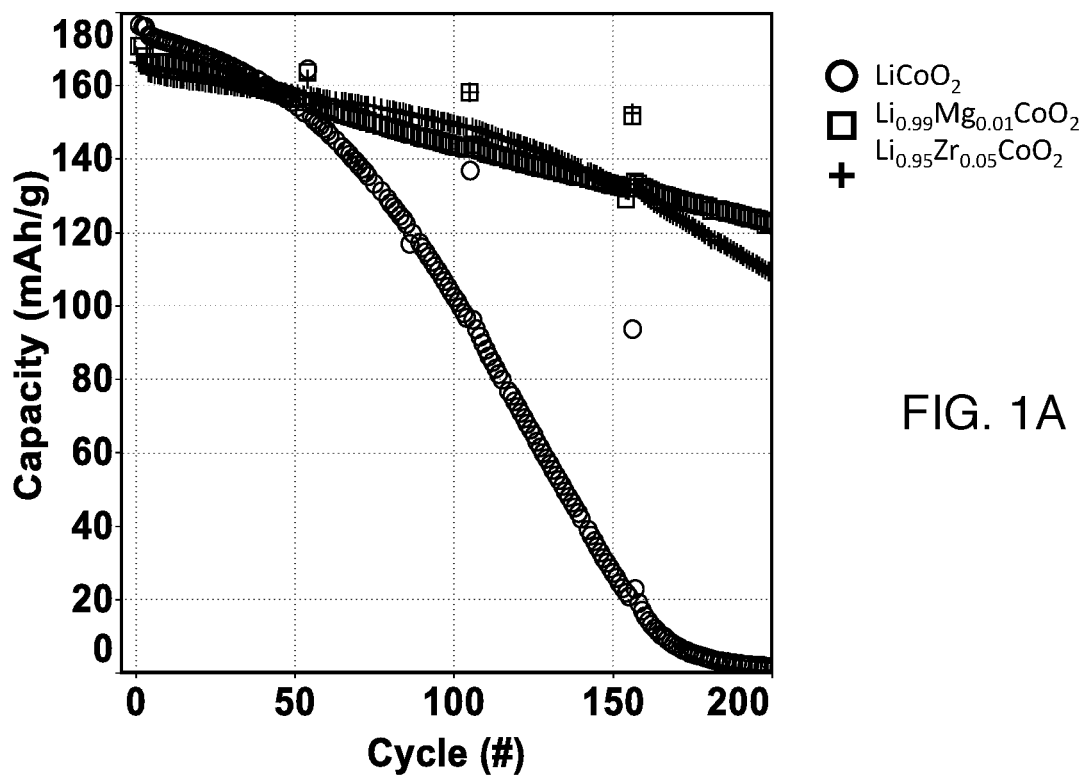
FIG. 1A illustrates characterization of the specific capacity as a function of cycle for certain active materials, including a control active material and two active materials formed according to embodiments of the present disclosure.

The following definitions apply to some of the aspects described with respect to some embodiments of the inventive subject matter. These definitions may likewise be expanded upon herein. Each term is further explained and exemplified throughout the description, figures, and examples. Any interpretation of the terms in this description should consider the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "LCO" refers to a lithium cobalt oxide cathode material of Formula (i) above.

The term "doped LCO" refers to a lithium cobalt oxide material with dopants added. The term "undoped LCO" refers to lithium cobalt oxide.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "Group I element" refers to a chemical element in group 1 of the periodic table, including sodium (Na), potassium (K), rubidium (Rb), caesium (Cs), and francium (Fr).

The term "Group II element" refers to a chemical element in group 2 of the periodic table, beryllium (Be), magnesium (Mg), calcium (Ca), strontium (Sr), barium (Ba), and radium (Ra).

The terms "milling" and "mixing" are used interchangeably, except in the instances where low energy mixing processes are specified. In such instances, the materials would be predominantly mixed rather than milled.

The term "cycle life" refers to the change in discharge capacity of a battery as a function of cycle number. That is, a battery with adequate cycle life will substantially maintain its discharge capacity at higher cycle numbers. Cycle life does not necessarily refer to battery properties other than discharge capacity.

Ranges presented herein are inclusive of their endpoints. Thus, for example, the range 1 to 3 includes the values 1 and 3 as well as intermediate values. However, ranges given using symbols (e.g. $5 < x \leq 10$) should be interpreted according to the accepted mathematical definitions of those ranges.

In certain embodiments, an electrode material is formed in which some atomic sites are doped with at least one dopant. The dopants can be selected from Group I elements, Group II elements, and transition metals. The doping site can be a lithium site.

The doped material can be prepared by suitable synthetic methods, including solid state chemical reaction, ion exchange substitution, and the like. Non-limiting examples of synthetic methods are presented herein.

For example, magnesium can be doped into lithium sites in an electrode material. The material in this preferred embodiment can have a composition according to Formula (ii):

$$Li_{1-x}M_xCoO_{2-d} \quad \text{(ii)}$$

where $0 < x \leq 0.2$, $0 < d \leq 0.2$ and M is magnesium, zirconium, niobium, sodium, or combinations thereof. For example, the undoped material can have the formula $LiCoO_2$. With this starting material, dopants can be added according to suitable methods such as milling to yield doping of magnesium, zirconium, niobium, and/or sodium at the lithium site. In Formula (ii), The formulas below represent a range of possible preferred doping levels according to Formula (ii) wherein M is magnesium:

$Li_{0.99}Mg_{0.01}CoO_2$
$Li_{0.98}Mg_{0.02}CoO_2$
$Li_{0.97}Mg_{0.03}CoO_2$
$Li_{0.96}Mg_{0.04}CoO_2$
$Li_{0.95}Mg_{0.05}CoO_2$
$Li_{0.94}Mg_{0.06}CoO_2$
$Li_{0.93}Mg_{0.07}CoO_2$
$Li_{0.92}Mg_{0.08}CoO_2$
$Li_{0.91}Mg_{0.09}CoO_2$
$Li_{0.90}Mg_{0.10}CoO_2$

In other embodiments, there is a range of possible preferred doping levels according to Formula (ii) wherein M is zirconium:

$Li_{0.99}Zr_{0.01}CoO_2$
$Li_{0.98}Zr_{0.02}CoO_2$
$Li_{0.97}Zr_{0.03}CoO_2$
$Li_{0.96}Zr_{0.04}CoO_2$
$Li_{0.95}Zr_{0.05}CoO_2$
$Li_{0.94}Zr_{0.06}CoO_2$
$Li_{0.93}Zr_{0.07}CoO_2$
$Li_{0.92}Zr_{0.08}CoO_2$
$Li_{0.91}Zr_{0.09}CoO_2$
$Li_{0.90}Zr_{0.10}CoO_2$

In other embodiments, there is a range of possible preferred doping levels according to Formula (ii) wherein M is niobium:

$Li_{0.99}Nb_{0.01}CoO_2$
$Li_{0.98}Nb_{0.02}CoO_2$
$Li_{0.97}Nb_{0.03}CoO_2$
$Li_{0.96}Nb_{0.04}CoO_2$
$Li_{0.95}Nb_{0.05}CoO_2$
$Li_{0.94}Nb_{0.06}CoO_2$
$Li_{0.93}Nb_{0.07}CoO_2$
$Li_{0.92}Nb_{0.08}CoO_2$
$Li_{0.91}Nb_{0.09}CoO_2$
$Li_{0.90}Nb_{0.10}CoO_2$

In other embodiments, there is a range of possible preferred doping levels according to Formula (ii) wherein M is sodium:

$Li_{0.99}Na_{0.01}CoO_2$
$Li_{0.98}Na_{0.02}CoO_2$
$Li_{0.97}Na_{0.03}CoO_2$
$Li_{0.96}Na_{0.04}CoO_2$
$Li_{0.95}Na_{0.05}CoO_2$
$Li_{0.94}Na_{0.06}CoO_2$
$Li_{0.93}Na_{0.07}CoO_2$
$Li_{0.92}Na_{0.08}CoO_2$
$Li_{0.91}Na_{0.09}CoO_2$
$Li_{0.90}Na_{0.10}CoO_2$

The above formulas are not intended to be limiting and merely illustrate one range of doping combinations. The present disclosure embraces the full range of possible combinations of elements that are mathematically possible given the ranges of Formula (ii). The above formulas can have variations in d independent of the value of x.

In certain preferred embodiments, M and x are chosen such that M is magnesium and x is 0.01. In other preferred embodiments, M and x are chosen such that M is zirconium and x is 0.05.

In other embodiments, the cobalt site can also have a dopant and the material in this embodiment can have a composition according to Formula (iii):

$$Li_{1-x}M_xCo_{1-y}M'_yO_{2-d} \qquad (iii)$$

where $0<x\leq0.2$, $0\leq y<1$, and $0<d\leq0.2$. In this embodiment, M and M' are independently selected from transition metals, Group I elements, and Group II elements. M is preferably magnesium, zirconium, niobium, sodium, or combinations thereof. M' is preferably a transition metal.

Advantageously, the doped materials disclosed herein maintain the crystal structure of the undoped electrode material. The layered oxide phase is composed of $Li_{1-x}M_xCoO_2$ or $Li_{1-x}M_xCo_{1-y}M'_yO_{2-d}$ while x varies with the level of doping.

The preferred doped materials disclosed herein maintain a layered oxide phase in the doped electrode material. A preferred doping site for magnesium, zirconium, niobium, or sodium in an electrode material would be the lithium site in the layered oxide phase. The examples herein demonstrate the particular suitability of magnesium and zirconium with $LiCoO_2$ materials.

Without being bound by particular theories or mechanisms of action, the dopants disclosed herein may modify the lattice parameters and local chemical bond energy of the lithium cobalt oxide cathode materials as those materials lose lithium ions. As the lithium cobalt oxide cathode material loses lithium ions, and in particular as the amount of lithium ions in the lithium cobalt oxide cathode material decreases to less than about 50% of its original stoichiometric amount. In a conventional lithium cobalt oxide cathode material, a substantial amount of lithium is needed to stabilize the trigonal crystallographic structure of a conventional lithium cobalt oxide cathode material. Structurally, certain of the metal cations doped in the lithium sites with an ionic radius larger than lithium may help maintain the trigonal structure as the lithium ion concentration decreases. And, the greater negative charge on certain of the metal cations doped in the lithium sites can similarly help maintain the trigonal structure. The metal cations will be kinetically more difficult to transport and act as pillars in the structure and thereby stabilize the structure. Thus, by compensating for the physical and chemical stresses that occur in a conventional lithium cobalt oxide cathode material, the dopants disclosed herein can help to maintain the trigonal structure of lithium cobalt oxide cathode materials and improve the cycle life (i.e., reduce capacity fade).

Indeed, data presented herein demonstrate a comparatively low capacity fade (high capacity retention) for a doped electrode material. The compositions of the inventive subject matter can improve at least the capacity, capacity retention, and rate capability of electrode materials while retaining the other favorable performance and commercial attributes of such materials.

The following examples describe specific aspects of some embodiments of the inventive subject matter to illustrate and provide a description for those of ordinary skill in the art. The examples should not be construed as limiting the inventive subject matter, as the examples merely provide specific methodology useful in understanding and practicing some embodiments.

EXAMPLES

Materials and Synthetic Methods. An electrode material is prepared via solid state chemistry methods. Precursors used include elemental metals, hydroxides, carbonates, oxides, nitrides, hydrides, and others. Certain preferred precursors of the dopants include Mg, $Mg(OH)_2$, $MgCO_3$, Zr, $Zr(OH)_4$ Nb, $Nb_2O_5$ NaOH, and $Na_2CO_3$. The as-received precursors from commercial sources are milled with $Li_2CO_3$ and $Co_3O_4$ at stoichiometric ratios desired to make a target composition. After milling, the mixture was annealed at a temperature in a range of from about 600 to about 1200 degrees Celsius for a time in a range of from about 3 to about 24 hours. This was done under an air flow of about 20 L/min. Metals such as Mn, Fe, Ni, Cu, Zn, Mo, and Ti can be accommodated by this method, amongst others. Some electrode materials were also prepared through ion exchange substitution by mixing the above prepared $LiCoO_2$ mixture and a eutectic composition of $MgCl_2$ and KCl at desired ratios For example, the methods described in the following reference, which is incorporated by reference herein, may be applicable: Yoshiyuki Inaguma, Nozomi Okuyama, Yuri Atsumi, and Tetsuhiro Katsumata, $Mg^{2+}$ Ion-exchange with the $Li^+$ Ion in a Fast Li Ion-conducting Perovskite $La_{0.55}Li_{0.35}TiO_3$, Chemistry Letters 2002, 1106-1107. The resulting material was then annealed at a temperature in the range of from about 300 degrees Celsius to about 450 degrees Celsius. The annealing time was from about 5 hours to about 20 hours in an atmosphere of nitrogen gas or air. The flow rate was about 20 L/min. The annealed material was then washed with water and dried in a vacuum.

Electrode Formulation. An electrode was prepared using the dried powder and mixing it with conductive carbon, poly(vinylidene fluoride) (Sigma Aldrich), and 1-methyl-2-pyrrolidinone (Sigma Aldrich). This slurry was then deposited on a current collector. The current collector can be stainless steel or aluminum according to some embodiments. The slurry was then dried to form a composite cathode. Certain of the materials were analyzed by scanning electron microscopy and energy-dispersive X-ray spectroscopy. This analysis revealed a fairly homogenous material resulting from the synthetic methods disclosed herein.

Electrochemical Characterization. Electrochemical cells were assembled in a high purity argon filled glove box (M-Braun, $O_2$ and humidity contents<0.1 ppm), unless otherwise specified. Each cell contained a lithium foil anode, the above composite cathode, and a polypropylene separator. The electrolyte for these cells was a mixture of ethylene carbonate and ethyl methyl carbonate with $LiPF_6$ as a lithium salt. The cells were sealed and cycled between 3 V and 4.4 V (or 4.55 V in some cases) at 30 degrees Celsius with a 1 C cycling rate at 160 mAh/g (or 215 mAh/g in some cases) with lithium counter electrode, and between 3 V and 4.45 V at 45 degrees Celsius with a 1 C cycling rate at 205 mAh/g with graphite counter electrode to measure cell characteristics.

Results

FIG. 1A illustrates characterization of the specific capacity as a function of cycle for certain active materials, including a control active material and two active materials formed according to embodiments of the present disclosure.

In this figure, the specific capacity across multiple cycles of two tested compounds, $Li_{0.99}Mg_{0.01}CoO_2$ (represented by boxes) and $Li_{0.95}Zr_{0.05}CoO_2$ (represented by crosses) is improved as compared the undoped LCO (represented by circles).

Figure 1B:
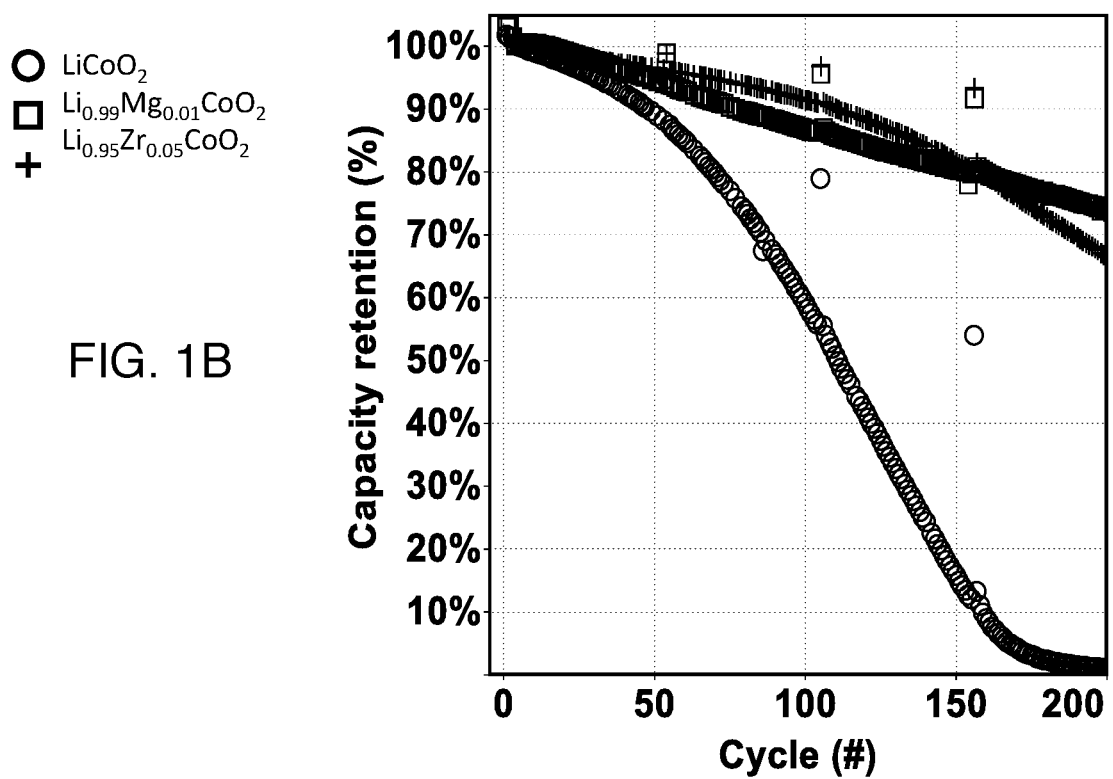
FIG. 1B illustrates characterization of the capacity retention as a function of cycle for certain active materials, including a control active material and two active materials formed according to embodiments of the present disclosure.

FIG. 1B illustrates characterization of the capacity retention as a function of cycle for certain active materials, including a control active material and two active materials formed according to embodiments of the present disclosure. This figure shows the capacity retention of both compounds in relation to undoped LCO across the same cycles, showing that specific capacity is better retained across cycles in the doped LCO (the boxes and crosses representing the same materials as in FIG. 1A) than the undoped LCO.

FIGS. 1A and 1B provide support for the dopants providing resistance to structural degradation (e.g., phase transition) in the compounds having doping on the lithium site as compared to the undoped LCO.

Figure 2A:
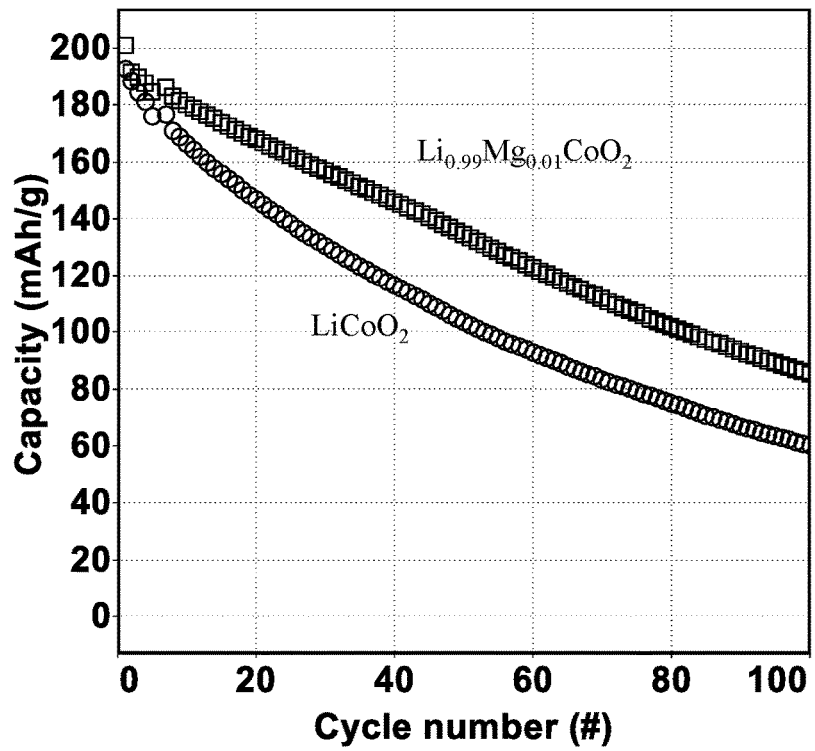
FIG. 2A illustrates characterization of the specific capacity as a function of cycle for certain active materials, including a control active material and an active material formed according to embodiments of the present disclosure.

FIG. 2A illustrates characterization of the specific capacity as a function of cycle for certain active materials, including a control active material and an active material formed according to embodiments of the present disclosure. In this figure, the specific capacity across multiple cycles of $Li_{0.99}Mg_{0.01}CoO_2$ (represented by boxes) is improved as compared to the undoped LCO (represented by circles). In both FIGS. 2A and 2B, the test battery was discharged at a 1 C rate and cycled between 3 V –4.45 V versus a graphite anode at 45 degrees Celsius.

Figure 2B:
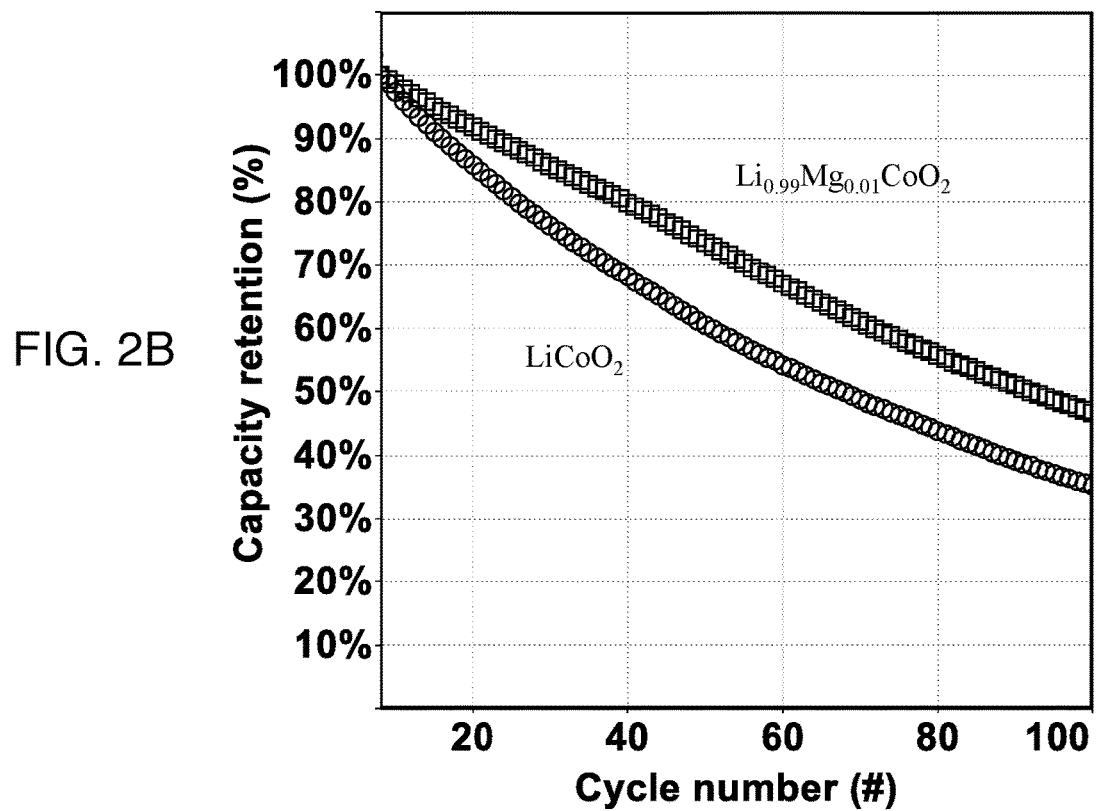
FIG. 2B illustrates characterization of the capacity retention as a function of cycle for certain active materials, including a control active material and an active material formed according to embodiments of the present disclosure.

FIG. 2B illustrates characterization of the capacity retention as a function of cycle for certain active materials, including a control active material and an active material formed according to embodiments of the present disclosure. Both FIG. 2A and FIG. 2B demonstrate that certain dopants improve the cycle life of lithium cobalt oxide materials even at relatively high temperatures.

Figure 3A:
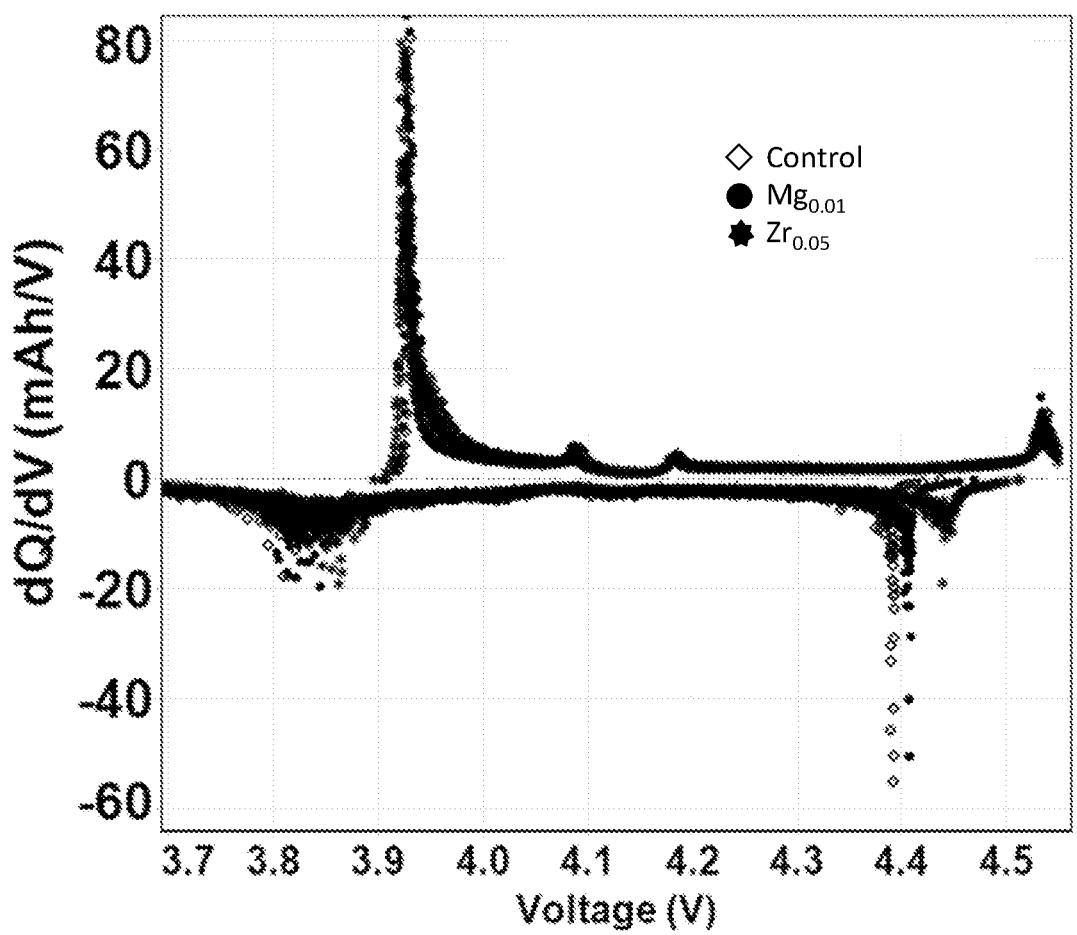
FIGS. 3A and 3B illustrate characterization of differential capacity as a function of voltage for certain active materials, including a control active material and two active materials formed according to embodiments of the present disclosure.
Figure 3B:
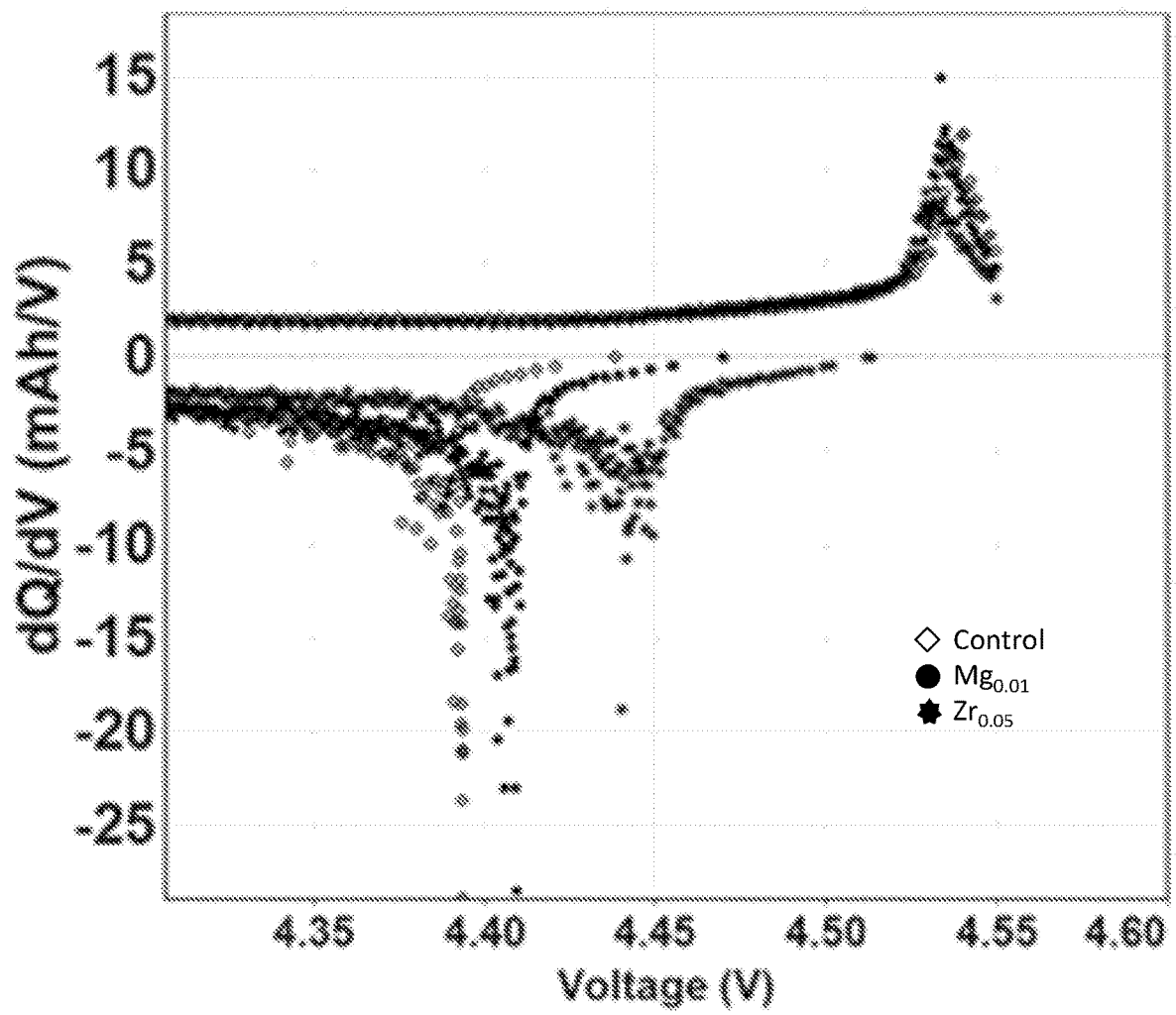

FIGS. 3A and 3B illustrates characterization of differential capacity as a function of voltage for certain active materials, including a control active material and two active materials formed according to embodiments of the present disclosure. FIG. 3A shows the differential capacity (dQ/dV) traces versus voltage on cycle 4 of an undoped $LiCoO_2$ (represented by diamonds), a test material $Li_{0.99}Mg_{0.01}CoO_2$ (represented by filled circles), and a test material $Li_{0.95}Zr_{0.05}CoO_2$ (represented by asterisks). The batteries were cycled between 3 V and 4.55 V versus a $Li^+$ anode. FIG. 3B is a magnification of the high voltage range of the plot of FIG. 3A and shows that both magnesium-doped $LiCoO_2$ and zirconium-doped $LiCoO_2$ have higher discharge voltage than pure $LiCoO_2$, but much smaller charge voltage difference among them.

Several investigations have identified phase transitions in layered $LiCoO_2$ above 4.5 V. Most recently, these transitions were identified as being from the O3 phase to the H1-3 phase around 4.55 V and from the H1-3 phase to the O1 phase around 4.62 V. Some researchers have attributed poor cycling life above 4.2 V to these phase transitions. The better performance seen in FIG. 3 for the two doped $LiCoO_2$ materials as compared to the pure $LiCoO_2$ (higher discharge voltage around 4.4 V which corresponds to the charge around 4.55 V) is likely caused by improved structural stability (e.g., less phase change) at the high voltage.

Many embodiments disclosed herein involve doping certain elements into the lithium sites of LCO materials. While doping is a known technique, the relevant prior art does not disclose the doping presented herein, either in ratio, location, or substance. While Zou et al. have experimented with doping $LiCoO_2$ for high voltage cycling and found positive results for enhancing high voltage cycling performance, Zou et al. doped on the cobalt site. Zuo et al. do not disclose doping on the lithium site.

Other research has been performed doping on both the Co site and the Li site, such as in Luo et al., which examined thirty samples with formulas $(Li_{1-z})_xMg_z[Co_{1-z}Mg_z]O_2$ and $Li_x[Co_{1-z}Mg_z]O_2$ and categorized various properties thereof. However, no combination of these stoichiometric formulas can render the compounds tested or disclosed herein due to the ratio of Co and M being dependent on z.

Koyama et al. explored doping of LCO compounds and theoretical results and limits for doing so. They discuss the theoretical possibilities from first principles of doping $LiCoO_2$ with various compounds. However there is no suggestion of ratio or method for doping on the lithium site with any of the substances disclosed herein and no capacity stability results are posited for doing so.

Kazada et al. doped $LiCoO_2$ with both sodium and potassium and found that sodium and potassium at levels of 1%, 5%, and 2.5% of total mixture by volume produced similar capacities across cycling to undoped $LiCoO_2$. This is an antithetical result to those presented herein and the stoichiometric ratios presented herein where not utilized. Rather, Kazada et al. used volumetric ratios of sodium and potassium. Again, there is no indication that doping occurred on the lithium site.

Wang et al. found improved capacity across a number of cycles when doping $LiCoO_2$ with magnesium. However, this was only tested in conjunction with a zirconium oxyfluoride coating, not presented herein. Additionally, there is no doping of specifically the lithium site presented.

Chandrasekaran et al. synthesized a cathode similar to $LiCoO_2$ and various dopants, however this was with the addition of copper to the chemical structure tested.

While the inventive subject matter has been described with reference to the specific embodiments thereof, it should be understood by those skilled in the art that various changes may be made and equivalents may be substituted without departing from the true spirit and scope of the inventive subject matter as defined by the appended claims. In addition, many modifications may be made to adapt a particular situation, material, composition of matter, method, or process to the objective, spirit and scope of the inventive subject matter. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the inventive subject matter.

What is claimed is:

1. An electrode, comprising:
   a material represented by $Li_{1-x}M_xCoO_{2-d}$ where $0<x\le0.2$ and $0\le d\le0.2$;
   wherein M comprises a metal selected from the group consisting of transition metals, Group I elements, and Group II elements.

2. The electrode of claim 1, wherein M is present in a lithium site of the material.

3. The electrode of claim 1, wherein M is magnesium.

4. The electrode of claim 1, wherein M is zirconium.

5. The electrode of claim 1, wherein M is niobium.

6. The electrode of claim 1, wherein M is sodium.

7. The electrode of claim 1, wherein $0<x\le0.1$.

8. The electrode of claim 1, wherein $0<x\leq 0.05$.

9. The electrode of claim 1, wherein d is 0.

10. A battery comprising:
an anode;
a cathode; and
an electrolyte between the anode and the cathode, wherein the cathode comprises an active material represented by $Li_{1-x}M_xCoO_{2-d}$, where $0<x\leq 0.2$, $0\leq d\leq 0.2$, and M comprises a metal selected from the group consisting of transition metals, Group I elements, and Group II elements.

11. The battery of claim 10, wherein M is present in a lithium site of the active material of the cathode.

12. The battery of claim 10, wherein M is magnesium.

13. The battery of claim 10, wherein M is zirconium.

14. The battery of claim 10, wherein M is niobium.

15. The battery of claim 10, wherein M is sodium.

16. The battery of claim 10, wherein $0<x\leq 0.1$.

17. The battery of claim 10, wherein the material comprises $Li_{0.95}Zr_{0.05}CoO_2$.

18. The battery of claim 10, wherein the material comprises $Li_{0.99}Mg_{0.01}CoO_2$.

19. The battery of claim 10, wherein the anode comprises lithium foil, and the electrolyte comprises a lithium salt and at least one carbonate.

20. The battery of claim 10, wherein d is 0.

* * * * *